INVENTOR.
KURT ZWICK
BY Dicke and Craig
ATTORNEYS

INVENTOR.
KURT ZWICK
BY Dicke and Craig
ATTORNEYS

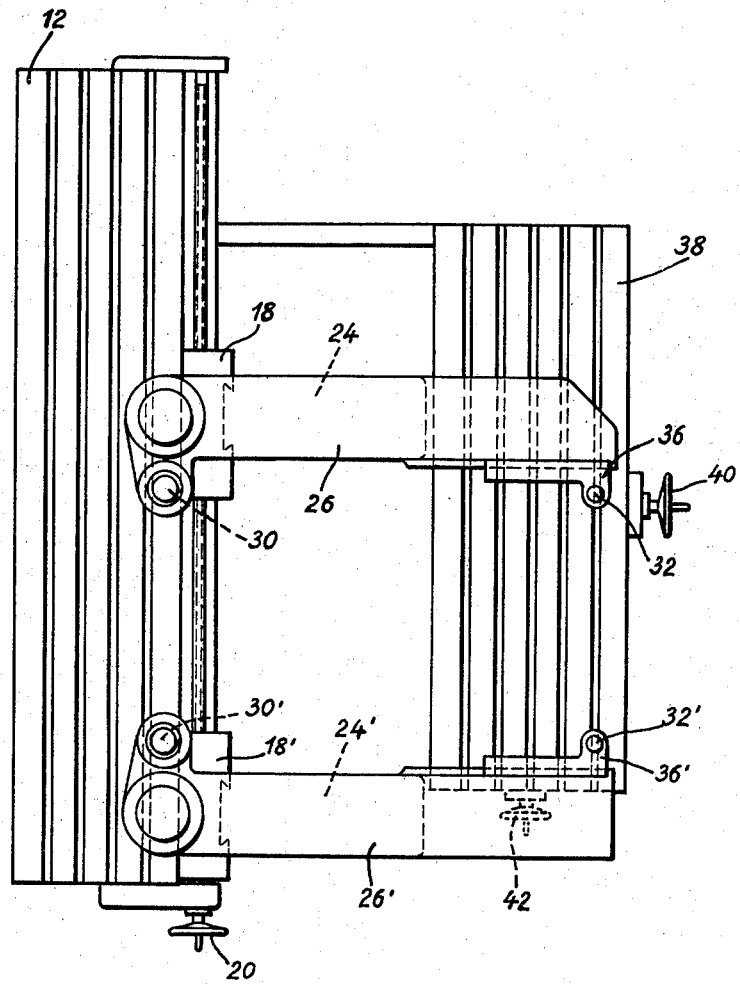

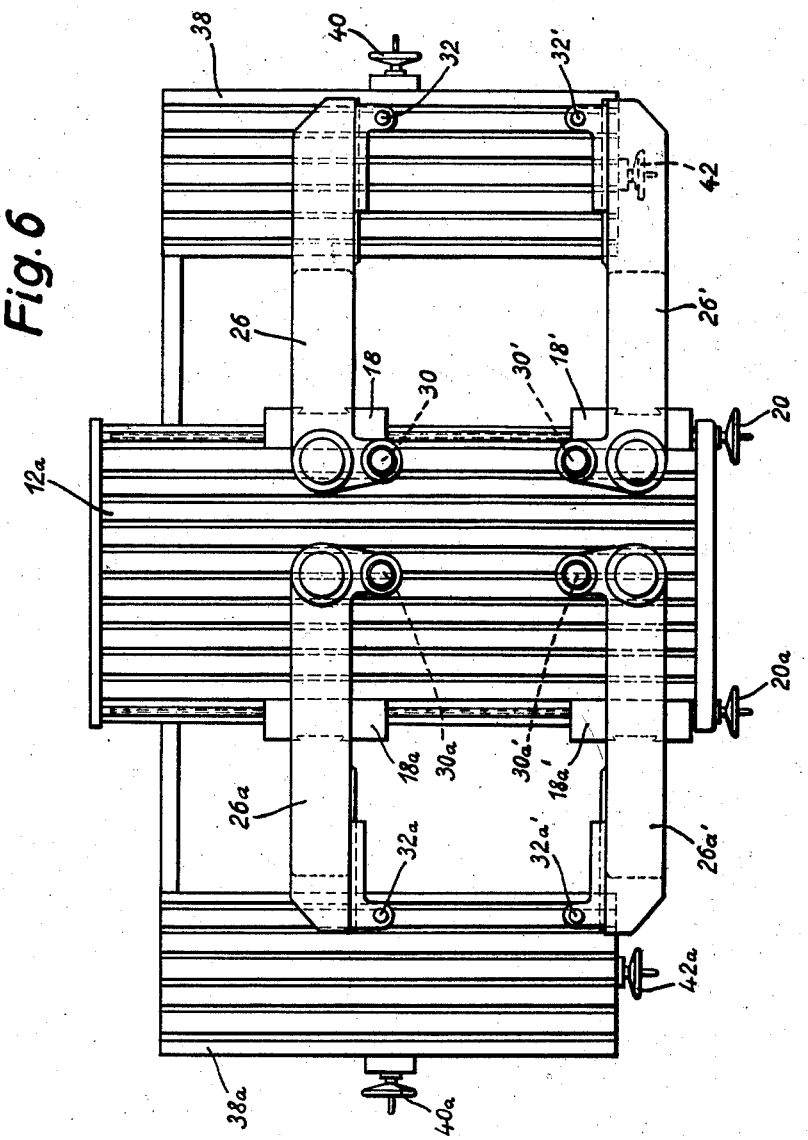

United States Patent Office 3,165,974
Patented Jan. 19, 1965

3,165,974
DUPLICATING MILLING MACHINE
Kurt Zwick, Munich, Germany, assignor to Hans Deckel, Munich, Germany, and Friedrich Wilhelm Deckel, Zug, Switzerland
Filed Sept. 8, 1961, Ser. No. 136,901
Claims priority, application Germany Sept. 14, 1960
11 Claims. (Cl. 90—13)

The present invention relates to a duplicating milling machine provided with a supporting beam adapted to be adjustable horizontally in three orthogonal directions, at which are arranged the work tool and the feeler device, and further provided with spatially separated tables for the work piece and the model.

The prior art machines for duplicating cutting or milling operations in three dimensions entail the disadvantage that the supporting beam or carrier support executing all of the movements is guided on its own pedestal or support along the machine table, and this guidance is arranged between the separated tables for the model and the workpiece accommodation. This, however, impairs the observation of the model and of the work piece; for the pedestal or support for the supporting beam or carrier support stands exactly in that place from which both the work piece and model could be observed in the most favorable manner.

The present invention makes it possible to stand during the entire operation between the model table and work piece table and to follow the supporting beam between model and work piece by the fact that the guideway for the horizontal movements of the supporting beam in the longitudinal direction of the work table is arranged at the substantially vertical longitudinal side of the work table facing the model table. This advantage is of particular significance in case of machining of very long work pieces.

In a preferred embodiment of the present invention, the common carrier support of the work tool and of the sensing or feeler device is constructed as a roughing-out machine controlled by appropriate feeler means of conventional construction and complemented by a second carrier support which also carries a tool and a feeler device and which is movably secured at the first carrier support in three coordinates parallel to itself. If the second carrier support is used with a finishing tool, then this feature of the present invention enables a manually executed finishing operation of the roughed-out work piece already while the roughing-out installation still terminates its work.

According to a further feature of the present invention, there are provided at the machine two mirror-image-like carrier supports for tool and feeler device of which each is carried by a stand or pedestal support participating in the longitudinal feed movements and which are both adapted to be controlled independently of one another. With such a machine it is possible to copy a large model by means of two simultaneously operating tools in approximately half the time if the working areas of both tools are so arranged that they overlap somewhat in the center thereof. It is also possible with the use of feeler control systems of any known conventional construction to cause synchronous control of both carrier supports by one of the two feeler devices in order to manufacture simultaneously two identical work pieces, or with a common control by means of one feeler device to reverse the movement in a horizontal direction in order to manufacture two mirror-image-like identical work pieces.

Accordingly, it is an object of the present invention to provide a duplicating machine tool which obviates, in a simple and effective manner, the shortcomings encountered with the prior art constructions.

It is another object of the present invention to provide a duplicating machine tool which is so arranged and constructed as to enable continuous observation, in a greatly facilitated manner, of the model and work piece.

Still another object of the present invention resides in the provision of a duplicating milling machine which permits machining of relatively long work pieces.

A further object of the present invention resides in the provision of a duplicating milling machine which permits a speed-up in the time required for machining a workpiece by enabling manually guided finishing operations while the rough machining operations are still being completed.

Still a further object of the present invention resides in the provision of a duplicating milling machine in which relatively large models may be readily duplicated with great savings in time.

These and other objects, features and advantages of the present invention will become more obvious from the following description when taken in connection with the accompanying drawing which shows, for purposes of illustration only, several embodiments in accordance with the present invention, and wherein FIGURE 1 is a front elevational view of a duplicating milling machine in accordance with the present invention;

FIGURE 5 is a top plan view of still another modified embodiment of a duplicating milling machine in accordance with the present invention, and FIGURE 6 is a top plan view of a still further modified embodiment of a duplicating milling machine in accordance with the present invention.

Figure 1:
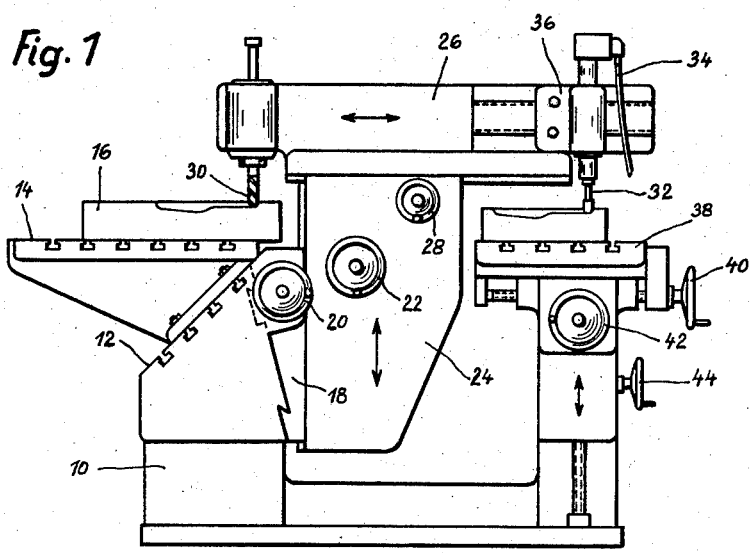
Figure 2:
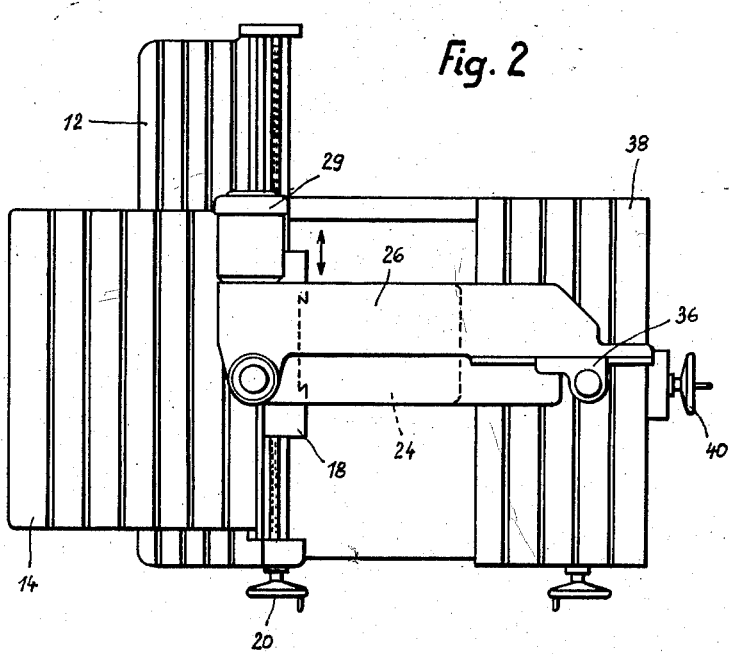
FIGURE 2 is a top plan view of the milling machine of FIGURE 1.

Referring now to the drawing wherein like reference numerals are used throughout the various views to designate corresponding parts, and more particularly to FIGURES 1 and 2, reference numeral 10 designates therein a machine frame which carries on the surface 12 thereof, inclined with respect to the horizontal end provided with clamping grooves of conventional construction, a clamping mechanism 14 of triangular cross section for the work piece 16. The clamping mechanism 14 may be displaced both horizontally along the inclined surface 12 as well as secured thereon at different heights by any suitable conventional means. A carriage 18 is guided within conventional horizontally extending longitudinal guide-ways provided at one side surface of the machine frame 10. The carriage 18 is adapted to be displaced within these horizontally extending longitudinal guide ways by means of the hand wheel 20 and its associated adjusting mechanism, in a manner known per se in the art. The carriage 18 supports thereon a housing support 24 forming a gear box of conventional construction which is adapted to be adjusted in the vertical direction by hand wheel 22 and its associated adjusting mechanism in a well-known conventional manner. A carrier support 26 is supported in guide-ways provided on the top surface of the housing support 24 which carrier support 26 is adapted to be horizontally displaced in the transverse direction by means of hand wheel 28 and its associated adjusting mechanism in a conventional manner. The carrier support 26 carries on the left side thereof the tool 30 driven by the motor 29 and on the right side thereof a feeler device 32 which may be of any conventional construction. An electric cable 34 leads from the feeler device 32 to a control installation (not shown) of any suitable well-known construction which transmits the deflection signals of the feeler 32 to the adjusting spindles or corresponding adjusting means of conventional construction associated with the hand wheels 22, 20 and/or 28 so that the movements of the carrier support 26 are automatically controlled in a conventional manner by the feeler device 32 and its associated control installation. The feeler device 32 is held in a holder 36 which is adapted to be displaced on the carrier support 26 and may be threadably secured thereon so that the distance from the tool 30 to the feeler device 32 can be adjusted.

To the right of the housing support 24 and separated thereby from the work table 12, 14 is the model table 38 which is adapted to be adjusted, independently of the work table 14, in the three coordinate directions thereof by the hand wheels 40, 42 and 44 and suitable adjusting mechanisms of conventional construction associated therewith.

Since the adjusting mechanisms associated with hand wheels 20, 22, 28, 40, 42, 44 as well as the feeler control systems controlling the operation of the adjusting mechanisms associated with hand wheels 20, 22 and 28 in response to the control signals produced by the feeler device 32 are well known in the art and form no part of the present invention, a detailed showing thereof is dispensed with herein for sake of clarity.

Additionally, since the operation of the machine tool illustrated in FIGURES 1 and 2 and is believed obvious to a person skilled in the art from the foregoing description and illustration of FIGURES 1 and 2, a detailed explanation thereof is also omitted herein.

Figure 3:
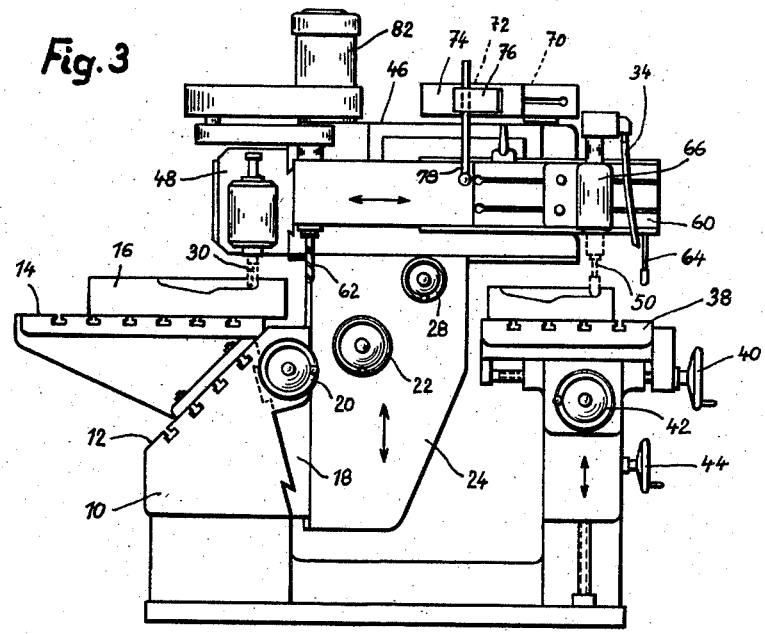
FIGURE 3 is a front elevational view of a modified embodiment of a duplicating milling machine in accordance with the present invention.
Figure 4:
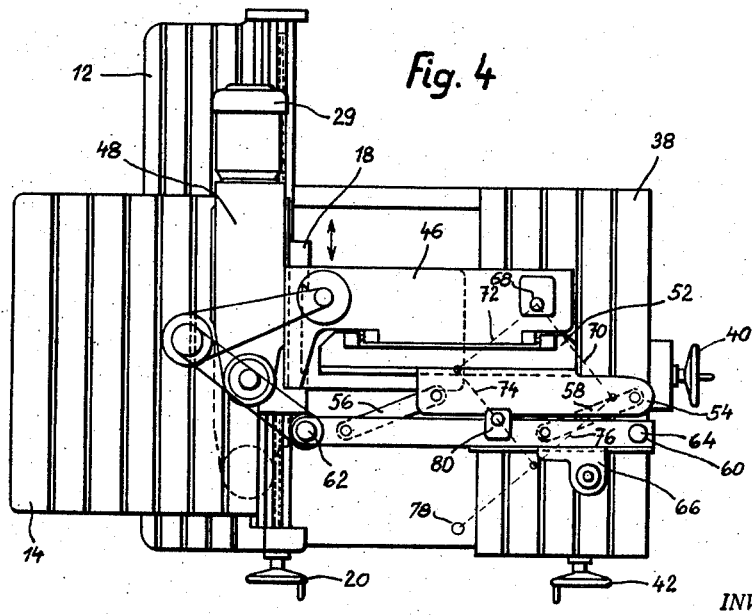
FIGURE 4 is a top plan view of the milling machine of FIGURE 3.

The machine tool according to FIGURES 3 and 4 is constructed in a manner substantially similar with and analogous to the machine tool of FIGURES 1 and 2. Again, similar reference numerals designate in the embodiment of FIGURES 3 and 4 corresponding parts described in connection with FIGURES 1 and 2. However, instead of the carrier support 26 of FIGURES 1 and 2, a differently constructed carrier support 46 for the work tool 30 and the feeler device 32 is arranged at the housing support 24. A carriage 48 is guided for horizontal displacements at the left side of the carrier support 46 within a dove-tail guide arrangement which carriage 48 contains the tool 30 and the motor 29. The carriage 48 may be displaced into the position thereof indicated in dash line in FIGURE 4 in which it is disposed opposite the feeler device 50. Furthermore, a second carriage 52 is movably supported at the carrier support 46 within vertical guide-ways and supports thereon a third carriage 54 adapted to be guided for horizontal movements relative thereto. A second carrier support 60 is secured at the carriage 54 by means of guide members 56 and 58 which second carrier support 60 carries the tool 62 and the feeler device 64. Consequently, the carrier support 60 is adapted to be moved, parallel to itself, in three coordinate directions. The feeler device 50 which again may be of any conventional construction and belongs to the tool 30 is secured on the carrier support 60 within the holder 66. The carrier support 60 is actuated by a pantograph which is supported on the carrier support 46 at 68, consists of guide members 70, 72, 74 and 76 and is provided within the guide member 76 with a handle 78. The guide member 74 of the pantograph is operatively connected with the carrier support 60 by means of coupling member 80. The tool 62 is driven by motor 82.

It is possible by the use of the machine illustrated in FIGURES 3 and 4 either to rough-out automatically by the use of the tool 30 and the feeler device 50 or to finish manually by the use of the tool 62 and the feeler device 64. During roughing-out operation, the carrier support 60 is held fast, by any suitable conventional means, in all three coordinate directions with respect to the carrier support 46 and the carriage 48 is displaced into the dash position thereof so that the feeler device 50 assumes the correct position with respect to the tool 30 in the operating position thereof. The fastening of the carrier support 60 is released during finishing operation so that it becomes freely movable for purposes of such operation.

Aside from the structural connection afforded by the common supporting structure of the milling machine disclosed in FIGURES 3 and 4, the tools 30 and 62 are not connected since they operate alternately. The roughing tool 30 is provided on an end side of the carrier 48 and is driven by the motor 29. In order to work with the tool 30 the carrier 48 is moved into the position shown in FIGURE 4 in dotted lines. With said tool 30 is associated the feeler 50. During the roughing operation, the feeler 50 hydraulically or electrically controls the tool 30 in the usual manner, namely, so that the surface of the model is traced path by path in the direction of the horizontal arrow in FIGURE 3. The vertical movements of the feeler 50 bring about a corresponding vertical displacement of the housing support 24 in the carriage 18. When one path is completed, the carriage is moved further, by the width of one path, in the direction of the vertical arrow of FIGURE 4 so that a new line can be machined. During the entire roughing operation, the finishing tool 62 and the feeler 64 associated with said finishing tool are not operating; the carrier support 60, normally moved by the pantograph 68-78, which support carries the holders for the tool 62 and the feeler 64, remains in the position shown in FIGURE 4; the tool 62 and the feeler 64 are not mounted in their holders. For finishing, the tool 30 and the feeler 50 are removed and the carrier 48 is moved backwards, so that the carrier support 60 with the finishing tool 62 and the feeler 64 are freely movable. For this movement the pantograph is used. The movements of the pantograph handle 78 are transmitted at a reduced scale via coupling member 80 to carrier support 60; this means that the milling pressure exerted by the tool 62 on the workpiece 16 is relatively greater than the force exerted on said handle 78. In this connection, reference is had to applicant's Patent 2,371,941 which corresponds with the present finishing device if the feeler is mounted in the holder 41 instead of in the holder 53. Thus, during the finishing operation, the tool 62 and the carrier support 60 carrying the feeler 64 are freely movable in relation to the carrier support 46, and for this purpose only the pantograph is used, that is for increasing the milling force to be exerted by hand.

The machine tool illustrated in FIGURE 5 also corresponds substantially with that of FIGURES 1 and 2. Again, similar reference numerals designate parts corresponding to those of FIGURES 1 and 2, fully described hereinabove in connection therewith. The embodiment of FIGURE 5 comprises, in addition to the structural group including the carriage 18, the housing support 24, and the carrier support 26 with the work tool 30 and the feeler device 32, a second structural group of mirror-image-like construction and including similar parts and designated with primed reference numerals of which the carrier support 26' is adapted to be controlled, by any suitable conventional means, independently of the carrier support 26.

The machine tool illustrated in FIGURE 6, in contrast to the embodiment of FIGURES 1 and 2, includes a work table 12a having a horizontal clamping surface. The embodiment of FIGURE 6 comprises at the machine frame altogether four structural groups 18 to 36, 18' to 36', 18a to 36a and 18a' to 36a' for the carrier support of the four tools and feeler devices as well as two model tables 38 and 38a which are arranged on either side of the work table 12a, respectively. Very large work pieces may be machined with the machine tool of FIGURE 6 whereby the model may be subdivided into two halves of which one half each is clamped onto a respective one of the two model tables 38 and 38a. The individual carrier supports 26, 26', 26a and 26a' may be selectively controlled by any suitable conventional means either separate from one another or also coupled together in any suitable manner. Since such control systems as well as the coupling means for connecting together any two or more and/or all of the carrier supports in their control movements are well known in the art and may be of any conventional construction, a detailed description is dispensed with herein.

While I have shown and described several embodiments in accordance with the present invention, it is understood that the same is not limited thereto but is susceptible of many changes and modifications within the spirit and scope thereof. For example, any appropriate conventional control system including conventional feeler means and feed means may be used in connection with the present invention. Additionally, the guide-ways and clamping arrangements may also be of any known construction. Consequently, I do not wish to be limited to the details shown and described herein, but intend to cover all such changes and modifications as are encompassed by the scope of the appended claims.

I claim:

1. A duplicating milling machine, comprising substantially horizontal carrier support means adapted to be adjusted in three orthogonal directions, tool means and feeler means at said carrier support means, essentially horizontally extending work table means, adapted to remain stationary during the milling operation, essentially horizontally extending model table means spatially separated from said work table means adapted to remain stationary during the milling operation, said work table means including a substantially vertical longitudinal side facing said model table means, and means for supporting said carrier support means on said substantially vertical side of said work table means including guide means disposed in said substantially vertical side for enabling horizontal movements of said carrier support means in the longitudinal direction of the work table means and means for enabling movements of said carrier support means in the remaining of said orthogonal directions.

2. A duplicating milling machine, comprising substantially horizontal carrier support means adapted to be adjusted in three orthogonal directions, tool means and feeler means at said carrier support means, essentially horizontally extending work table means adapted to remain stationary during the milling operation, essentially horizontally extending model table means spatially separated from said work table means adapted to remain stationary during the milling operation, carriage means, said work table means including a substantially vertical longitudinal side facing said model table means, first guide means provided in said substantially vertical side of said work table means operatively connecting said carriage means with said work table means to enable substantially horizontal movements of said carriage means in the longitudinal direction of and relative to the work table means, supporting means for said carrier support means, second guide means operatively connecting said supporting means at said carriage means to enable substantially vertical movements of said supporting means relative to said carriage means, and third guide means operatively connecting said carrier support means with said supporting means to enable substantially horizontal movements of said carrier support means relative to said supporting means in a direction essentially transverse to said longitudinal direction.

3. A duplicating milling machine, comprising substantially horizontal carrier support means adapted to be adjusted in three orthogonal directions, tool means and feeler means at said carrier support means, essentially horizontally extending work table means adapted to remain stationary during the milling operation, essentially horizontally extending model table means spatially separated from said work table means adapted to remain stationary during the milling operation, said model table means being adjustable independently of said work table means, carriage means, said work table means including a substantially vertical longitudinal side facing said model table means, first guide means provided in said substantially vertical side of said work table means operatively connecting said carriage means with said work table means to enable substantially horizontal movements of said carriage means in the longitudinal direction of and relative to the work table means, supporting means for said carrier support means, second guide means operatively connecting said supporting means at said carriage means to enable substantially vertical movements of said supporting means relative to said carriage means, and third guide means operatively connecting said carrier support means with said supporting means to enable substantially horizontal movements of said carrier support means relative to said supporting means in a direction essentially transverse to said longitudinal direction.

4. A duplicating milling machine, comprising substantially horizontal carrier support means adapted to be adjusted in three orthogonal directions, tool means and feeler means at said carrier support means, the distance between said tool means and said feeler means being adjustable, essentially horizontally extending work table means adapted to remain stationary during the milling operation, essentially horizontally extending model table means spatially separated from said work table means adapted to remain stationary during the milling operation, said model table means being adjustable independently of said work table means, carriage means, said work table means including a substantially vertical longitudinal side facing said model table means, first guide means provided in said substantially vertical side of said work table means operatively connecting said carriage means with said work table means to enable substantially horizontal movements of said carriage means in the longitudinal direction of and relative to the work table means, supporting means for said carrier support means, second guide means operatively connecting said supporting means at said carriage means to enable substantially vertical movements of said supporting means relative to said carriage means, and third guide means operatively connecting said carrier support means with said supporting means to enable substantially horizontal movements of said carrier support means relative to said supporting means in a direction essentially transverse to said longitudinal direction.

5. A duplicating milling machine, comprising first substantially horizontal carrier support means adapted to be adjusted in three orthogonal directions, tool means and feeler means at said first carrier support means, essentially horizontally extending work table means adapted to remain stationary during the milling operation, essentially horizontally extending model table means spatially separated from said work table means adapted to remain stationary during the milling operation, said work table means including a substantially vertical longitudinal side facing said model table means, guide means provided in said substantially vertical side of said work table means to enable the horizontal movements of said carrier support means in the longitudinal direction of the work table means, second carrier support means supporting thereon further tool means and further feeler means, and connecting means operatively connecting said second carrier support means with said first carrier support means to enable movements of said second carrier support means in three orthogonal directions parallel to itself.

6. A duplicating milling machine, comprising first substantially horizontal carrier support means adapted to be adjusted in three orthogonal directions, tool means and feeler means at said first carrier support means, essentially horizontally extending work table means adapted to remain stationary during the milling operation, essentially horizontally extending model table means spatially separated from said work table means adapted to remain stationary during the milling operation, said work table means including a substantially vertical longitudinal side facing said model table means, guide means provided in said substantially vertical side of said work table means to enable the horizontal movements of said carrier support means in the longitudinal direction of the work table means, control means operatively connected with said first carrier support means to control the movements thereof by said first-mentioned feeler means, second carrier support means supporting thereon further tool means and further feeler means, and connecting means operatively connecting said second carrier support means with said first carrier support means to enable movements of said second carrier support means in three orthogonal directions parallel to itself.

7. A duplicating milling machine, comprising first substantially horizontal carrier support means adapted to be adjusted in three orthogonal directions, tool means and feeler means at said first carrier support means, essentially horizontally extending work table means adapted to remain stationary during the milling operation, essentially horizontally extending model table means spatially separated from said work table means adapted to remain stationary during the milling operation, said work table means including a substantially vertical longitudinal side facing said model table means, guide means provided in said substantially vertical side of said work table means to enable the horizontal movements of said carrier support means in the longitudinal direction of the work table means, control means operatively connected with said first carrier support means to control the movements thereof by said first-mentioned feeler means, second carrier support means supporting thereon further tool means and further feeler means, and connecting means operatively connecting said second carrier support means with said first carrier support means to enable movements of said second carrier support means in three orthogonal directions parallel to itself including manually operated pantograph means.

8. A duplicating machine tool, comprising substantially horizontal carrier support means adapted to be adjusted in three orthogonal directions and adapted to support thereon the tool means and the feeler means, essentially horizontally extending work table means adapted to remain stationary during the milling operation, essentially horizontally extending model table means spatially separated from said work table means adapted to remain stationary during the milling operation, said work table means including a substantially vertical longitudinal side facing said model table means, and supporting means for said carrier support means, sole support means for supporting means provided in said substantially vertical side of said work table means, said sole support means comprising guide elements extending in the longitudinal direction of said work table means and enabling movements of said carrier support means in a horizontal one of said orthogonal directions between said work table means and said model table means so as to permit an observer standing between said table means to follow said tool means and feeler means during the entire machining operation.

9. A duplicating milling machine, comprising two carrier support means of mirror-image-like construction each adapted to be adjusted in three orthogonal directions, tool means and feeler means at each of said carrier support means, essentially horizontally extending work table means adapted to remain stationary during the milling operation, essentially horizontally extending model table means spatially separated from said work table means adapted to remain stationary during the milling operation, said work table means including at least one substantially vertical longitudinal side facing said model table means, separate stand means for each of said carrier support means, means for supporting said carrier support means on said substantially vertical side of said work table means including guide means provided in said substantially vertical side of said work table means to enable the horizontal movements of said stand means in the longitudinal direction of the work table means, and control means for controlling said stand means independently of one another.

10. A duplicating milling machine, comprising two carrier support means of mirror-image-like construction each adapted to be adjusted in three orthogonal directions, tool means and feeler means at each of said carrier support means, essentially horizontally extending work table means, essentially horizontally extending model table means spatially separated from said work table means adapted to remain stationary during the milling operation, said work table means including at least one substantially vertical longitudinal side facing said model table means, separate stand means for each of said carrier support means, guide means provided in said substantially vertical side of said work table means to enable the horizontal movements of said stand means in the longitudinal direction of the work table means, and control means for controlling said stand means independently of one another including feeler-responsive adjusting means for adjusting each of said carrier support means in dependence on the control signals produced by a respective feeler means.

11. A duplicating milling machine, comprising a first structural assembly, a second structural assembly, each of said structural assemblies essentially consisting of carrier support means adapted to be adjusted in three orthogonal directions for the tool and feeler means, carriage means, supporting means and essentially horizontally extending model table means adapted to remain stationary during the milling operations, essentially horizontally extending work table means spatially separated from and arranged between the model table means of said two structural assemblies, said work table means being adapted to remain stationary during the milling operations and being provided with two substantially vertical sides facing respective model table means, and guide means provided in said substantially vertical sides of said work table means to enable substantially horizontal movements of said structural assemblies relative to said work table means.

References Cited in the file of this patent

UNITED STATES PATENTS

| | | |
|---|---|---|
| 2,059,505 | Wright | Nov. 3, 1936 |
| 2,768,558 | Dubosclaid | Oct. 30, 1956 |
| 2,831,405 | Swallwey et al. | Apr. 22, 1958 |
| 2,832,239 | Bert et al. | Apr. 29, 1958 |

FOREIGN PATENTS

| | | |
|---|---|---|
| 832,674 | Great Britain | Apr. 13, 1960 |